(12) United States Patent
Chae et al.

(10) Patent No.: US 7,480,014 B2
(45) Date of Patent: Jan. 20, 2009

(54) ARRAY SUBSTRATE FOR LIQUID CRYSTAL DISPLAY SUBSTRATE HAVING HIGH APERTURE RATIO AND METHOD FOR FABRICATING THE SAME

(75) Inventors: Gee Sung Chae, Inchon (KR); Jae Kyun Lee, Gunpo-shi (KR); Ik Soo Kim, Gunpo-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/133,320

(22) Filed: Apr. 29, 2002

(65) Prior Publication Data
US 2003/0058377 A1 Mar. 27, 2003

(30) Foreign Application Priority Data
Sep. 24, 2001 (KR) ............................ 2001-0058961

(51) Int. Cl.
*G02F 1/1343* (2006.01)
*G02F 1/136* (2006.01)
(52) U.S. Cl. .......................... 349/39; 349/42; 349/139
(58) Field of Classification Search ............ 349/38–43, 349/139
See application file for complete search history.

(56) References Cited

U.S. PATENT DOCUMENTS

| | | | | |
|---|---|---|---|---|
| 5,151,806 A | * | 9/1992 | Kawamoto et al. | 349/39 |
| 5,724,107 A | * | 3/1998 | Nishikawa et al. | 349/38 |
| 5,835,170 A | | 11/1998 | Fujiwara et al. | |
| 5,907,379 A | * | 5/1999 | Kim et al. | 349/141 |
| 5,943,106 A | | 8/1999 | Sukenori et al. | |
| 5,969,778 A | * | 10/1999 | Oh et al. | 349/43 |
| 5,994,721 A | * | 11/1999 | Zhong et al. | 257/89 |

(Continued)

FOREIGN PATENT DOCUMENTS

KR 1999-006966 1/1999

*Primary Examiner*—Dung T. Nguyen
(74) *Attorney, Agent, or Firm*—Morgan Lewis & Bockius LLP

(57) ABSTRACT

An array substrate for a liquid crystal display device includes a transparent substrate, a gate line arranged along a first direction on the transparent substrate, a gate electrode extending from the gate line, a common line arranged along the first direction adjacent to the gate line and having a protrusion, a gate insulation layer on the transparent substrate to cover the gate line, the gate electrode, and the common electrode, an active layer on the gate insulation layer and over the gate electrode, first and second ohmic contact layers on the active layer, a data line arranged along a second direction perpendicular to the first upon the gate insulation layer, a source electrode extending from the data line and contacting the first ohmic contact layer, a drain electrode spaced apart from the source electrode and contacting the second ohmic contact layer, a first capacitor electrode formed on the gate insulation layer and connected to the drain electrode, the first capacitor electrode overlapping the common line and the protrusion of the common line, a passivation layer formed on the gate insulation layer to cover the data line, the source and drain electrodes, and the first capacitor electrode, the passivation layer having a first contact hole exposing a portion of the capacitor electrode, and a pixel electrode formed on the passivation layer and contacting the first capacitor electrode through the first contact hole.

24 Claims, 8 Drawing Sheets

U.S. PATENT DOCUMENTS

| | | | |
|---|---|---|---|
| 5,995,177 A * | 11/1999 | Fujikawa et al. | 349/46 |
| 6,091,466 A * | 7/2000 | Kim et al. | 349/43 |
| 6,091,473 A * | 7/2000 | Hebiguchi | 349/141 |
| 6,259,493 B1 * | 7/2001 | Nakamura et al. | 349/38 |
| 6,441,401 B1 * | 8/2002 | Jung et al. | 257/72 |
| 6,587,162 B1 | 7/2003 | Kaneko et al. | |
| 6,831,295 B2 * | 12/2004 | Tsubo | 257/48 |
| 6,882,375 B2 * | 4/2005 | Kim | 349/43 |
| 2002/0012078 A1 * | 1/2002 | Jung et al. | 349/38 |

* cited by examiner

ARRAY SUBSTRATE FOR LIQUID CRYSTAL DISPLAY SUBSTRATE HAVING HIGH APERTURE RATIO AND METHOD FOR FABRICATING THE SAME

The present invention claims the benefit of Korean Patent Application No. 2001-58961, filed in Korea on Sep. 24, 2001, which is hereby incorporated by reference.

BACKGROUND OF THE INVENTION

1. Field of the Invention

The present invention relates to a liquid crystal display (LCD) device and more particularly to a substrate having storage capacitors with a high aperture ratio.

2. Discussion of the Related Art

In general, since flat panel display devices are of thin design, low weight, and have low power consumption, they are increasingly being used for displays of portable devices. Among the various type of flat panel display devices, liquid crystal display (LCD) devices are widely used for laptop computers and desktop monitors because of their superiority in resolution, color image display, and display quality.

LCD devices have upper and lower substrates with electrodes that are spaced apart and face each other, and a liquid crystal material is interposed therebetween. Accordingly, when a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

Driving methods for driving the LCD device may be classified into one of a passive matrix driving method and an active matrix driving method. The passive matrix driving method uses a voltage difference induced between a data line (a video line) and a gate line (a scanning line), whereas the active matrix driving method uses a switching element, usually a thin film transistor. Currently, an active matrix LCD (AM LCD) device using the active matrix driving method is becoming increasing popular because of its high resolution and superiority in displaying video data. A typical AM LCD device has a plurality of switching elements and pixel electrodes that are arranged in a matrix array upon the lower substrate. Therefore, the lower substrate of the LCD device is commonly referred to as an array substrate. A common electrode that is made from a transparent conductive material is usually formed of the upper substrate of the LCD device. The lower substrate and the upper substrate are attached to each other using a sealant, and the liquid crystal material can be interposed between the upper and lower substrates.

The pixel electrode formed on the lower substrate and the common electrode formed upon the upper substrate form a liquid crystal capacitor, and a data signal and a common signal are applied to the pixel electrode and the common electrode, respectively. Then, a voltage difference is induced between the pixel and common electrodes to electrically charge the liquid crystal capacitor. However, although the voltage applied to the liquid crystal capacitor should be sustained until a next data signal is applied, electrical discharges generally occur at the liquid crystal capacitor. Accordingly, to prevent the electrical discharges and maintain the charge upon the liquid crystal capacitor, a storage capacitor is usually interconnected to the liquid crystal capacitor. In addition, the storage capacitor serves to stabilize gray level displays, prevent flicker, and prevent retention of residual images.

There are at least two possible configurations for the above-mentioned storage capacitor. The first configuration includes a capacitor electrode that is additionally formed on the lower substrate, and a capacitor electrode that is connected to the common electrode to function as an electrode of the storage capacitor. The second configuration includes a portion of the gate line to be used as an electrode of the storage capacitor. For example, a portion of an $(n-1)^{th}$ gate line is used as the electrode of the storage capacitor for an adjacent $(n)^{th}$ pixel. The first configuration is referred as a storage-on-common (SOC) structure or an independent storage capacitor type. The second configuration is referred as a storage-on-gate (SOG) structure or a previous gate type.

FIG. 1 is a partial plan view of an array substrate according to the related art. In FIG. 1, gate lines 11 are arranged along a first direction and data lines 12 are arranged along a second direction perpendicular to the first direction of the gate lines 11. A pair of gate and data lines 11 and 12 define a pixel region P1, and a pixel electrode 20 is positioned within the pixel region P1. A thin film transistor (TFT) T1 is positioned at one corner of the pixel region P1 near the crossing of the gate line 11 and data line 12. The TFT T1 includes a gate electrode 13 that extends from the gate line 11, a source electrode 14 that extends from the data line 12, a drain electrode 15 that is spaced apart from and positioned opposite to the source electrode 14, and an active layer positioned beneath the source and drain electrodes 14 and 15.

In a middle portion of the pixel region P1, a common line 17 is disposed and a capacitor electrode 18 is formed over the common line 17. Accordingly, the common line 17 and the capacitor electrode 18 constitute a storage capacitor with an interposed dielectric layer (not shown). Although not specifically shown in FIG. 1, insulators cover and protect the gate lines 11, data lines 12, TFT T1, common line 17 and capacitor electrode 18. The insulators have first and second contact holes 19a and 19b formed over the drain electrode 15 and capacitor electrode 18, respectively. Thus, the pixel electrode 20 formed within the pixel region P1 contacts the drain electrode 13 and the capacitor electrode 18 through the first contact hole 19a and through the second contact hole 19b, respectively, thereby the pixel electrode 20 overlaps portions of the gate and data lines 11 and 12.

In FIG. 1, since the SOC storage capacitor is formed within the pixel region P1 using the common line 17, a voltage is prevented from leaking from the charged liquid crystal capacitor. However, the common line 17 and the capacitor electrode 18, which form the SOG storage capacitor are usually formed of opaque metallic material. Accordingly, light passing through the pixel region is partially interrupted by the common line 17 and capacitor electrode 18. In addition, the LCD device commonly includes black matrix formed in the upper substrate in order to prevent light leakage, wherein a margin of the black matrix is provided for compensating for any misalignment of the upper and lower substrates.

FIG. 2 is a partial plan view of display areas of the array substrate of FIG. 1 according to the related art. In FIG. 2, light only penetrates areas "A," whereby only the areas "A" display image data. Accordingly, since an aperture ratio is significantly decreased because of a presence of the common line 17 and the capacitor electrode 18 disposed between the areas A, image quality of the image data is degraded.

SUMMARY OF THE INVENTION

Accordingly, the present invention is directed to an array substrate for a liquid crystal display substrate having a high aperture ratio and a method for fabricating the same, which substantially obviates one or more of problems due to limitations and disadvantages of the related art.

An object of the present invention is to provide a liquid crystal display device, which prevents the decrease of aperture ratio without voltage leakage from a capacitor.

An object of the present invention is to provide method for manufacturing a liquid crystal display device, which prevents the decrease of aperture ratio without voltage leakage from a capacitor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a transparent substrate, a gate line arranged along a first direction on the transparent substrate, a gate electrode extending from the gate line, a common line arranged along the first direction adjacent to the gate line and having a protrusion, a gate insulation layer on the transparent substrate to cover the gate line, the gate electrode, and the common electrode, an active layer on the gate insulation layer and over the gate electrode, first and second ohmic contact layers on the active layer, a data line arranged along a second direction perpendicular to the first upon the gate insulation layer, a source electrode extending from the data line and contacting the first ohmic contact layer, a drain electrode spaced apart from the source electrode and contacting the second ohmic contact layer, a first capacitor electrode formed on the gate insulation layer and connected to the drain electrode, the first capacitor electrode overlapping the common line and the protrusion of the common line, a passivation layer formed on the gate insulation layer to cover the data line, the source and drain electrodes, and the first capacitor electrode, the passivation layer having a first contact hole exposing a portion of the capacitor electrode, and a pixel electrode formed on the passivation layer and contacting the first capacitor electrode through the first contact hole.

In another aspect, a liquid crystal display device includes a first transparent substrate, a second transparent substrate facing the first transparent substrate, a gate line arranged on the first transparent substrate along a first direction, a data line arranged on the first transparent substrate along a second direction perpendicular to the first direction, the gate line and the data line perpendicularly crossing each other and defining a pixel region, a thin film transistor arranged on the first transparent substrate and adjacent to the pixel region, the thin film transistor electrically connected to both the gate line and the data line, a common line arranged on the first transparent substrate along the first direction parallel with and adjacent to the gate line, the common line having a protrusion, a first capacitor electrode overlapping a portion of the common line and the protrusion of the common line to form a first storage capacitor, the first capacitor electrode connected to the thin film transistor, a pixel electrode formed within the pixel region, the pixel electrode contacting the first capacitor electrode, a black matrix on the second transparent substrate, the black matrix covering the thin film transistor, the protrusion of the common line, and portions of the gate line and common line, and a common electrode on the second transparent substrate to cover the black matrix.

In another aspect, a method for fabricating an array substrate for a liquid crystal display device includes forming a gate line arranged along a first direction on a transparent substrate, forming a gate electrode extending from the gate line, forming a common line arranged along the first direction adjacent to the gate line on the transparent substrate and having a protrusion, forming a gate insulation layer on the transparent substrate to cover the gate line, the gate electrode, and the common electrode, forming an active layer on the gate insulation layer and over the gate electrode, forming first and second ohmic contact layers on the active layer, forming a data line arranged along a second direction perpendicular to the first upon the gate insulation layer, forming a source electrode extending from the data line and contacting the first ohmic contact layer, forming a drain electrode spaced apart from the source electrode and contacting the second ohmic contact layer, forming a first capacitor electrode on the gate insulation layer to connect to the drain electrode, the first capacitor electrode overlapping the common line and the protrusion of the common line, forming a passivation layer on the gate insulation layer to cover the data line, the source and drain electrodes, and the first capacitor electrode, the passivation layer having a first contact hole exposing a portion of the capacitor electrode, and forming a pixel electrode on the passivation layer to contact the first capacitor electrode through the first contact hole.

In another aspect, a method for fabricating a liquid crystal display device includes forming a gate line on a first transparent substrate along a first direction, forming a data line on the first transparent substrate along a second direction perpendicular to the first direction, the gate line and the data line perpendicularly crossing each other and defining a pixel region, forming a thin film transistor on the first transparent substrate and adjacent to the pixel region, the thin film transistor is electrically connected to both the gate line and the data line, forming a common line on the first transparent substrate along the first direction parallel with and adjacent to the gate line, the common line having a protrusion, forming a first capacitor electrode to overlap a portion of the common line and the protrusion of the common line to form a first storage capacitor, the first capacitor electrode connected to the thin film transistor, forming a pixel electrode within the pixel region, the pixel electrode contacting the first capacitor electrode, forming a black matrix on a second transparent substrate, the black matrix covering the thin film transistor, the protrusion of the common line, and portions of the gate line and common line, forming a common electrode on the second transparent substrate to cover the black matrix, and forming the first substrate to face the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
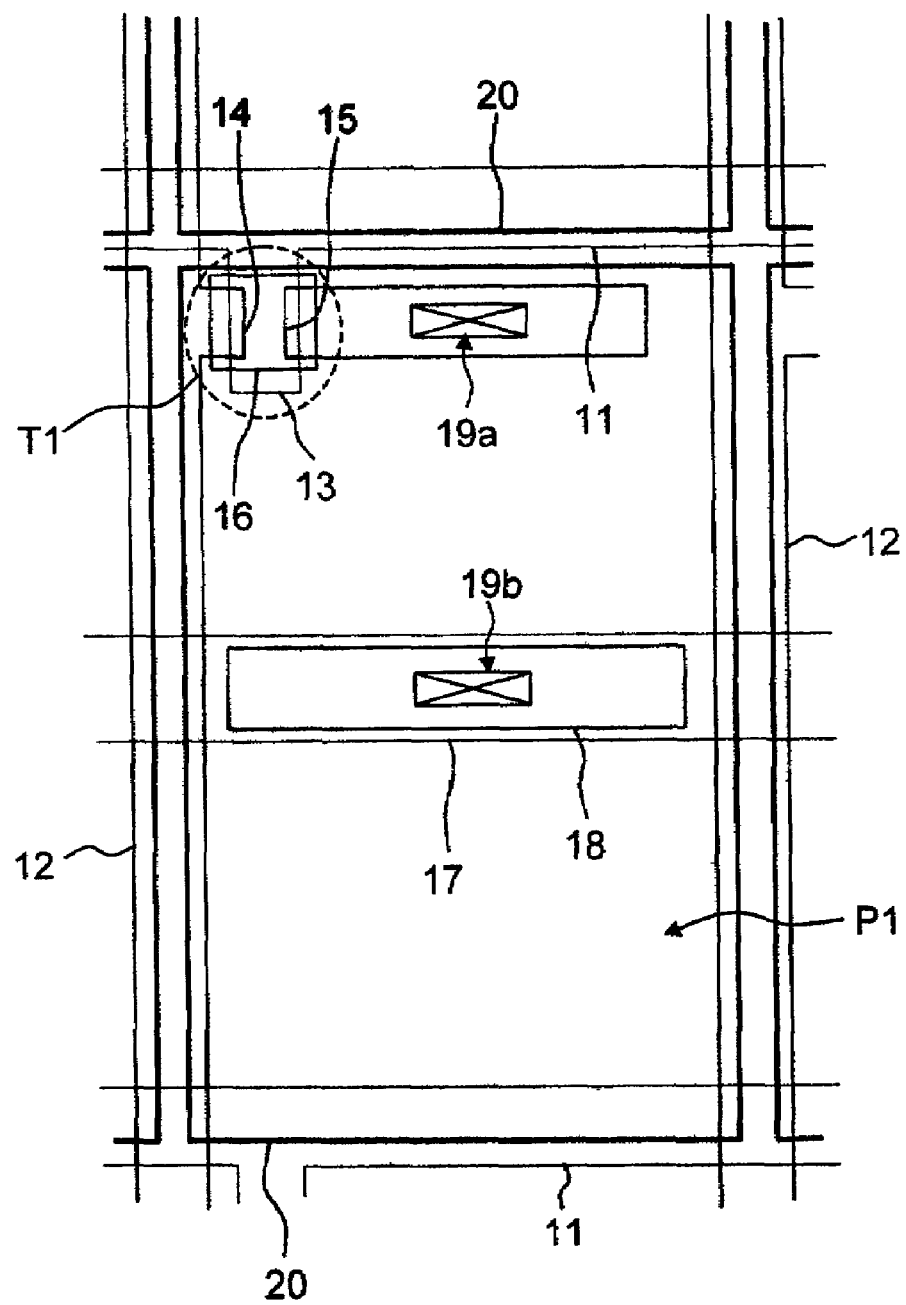
FIG. 1 is a partial plan view of an array substrate according to the related art.
Figure 2:
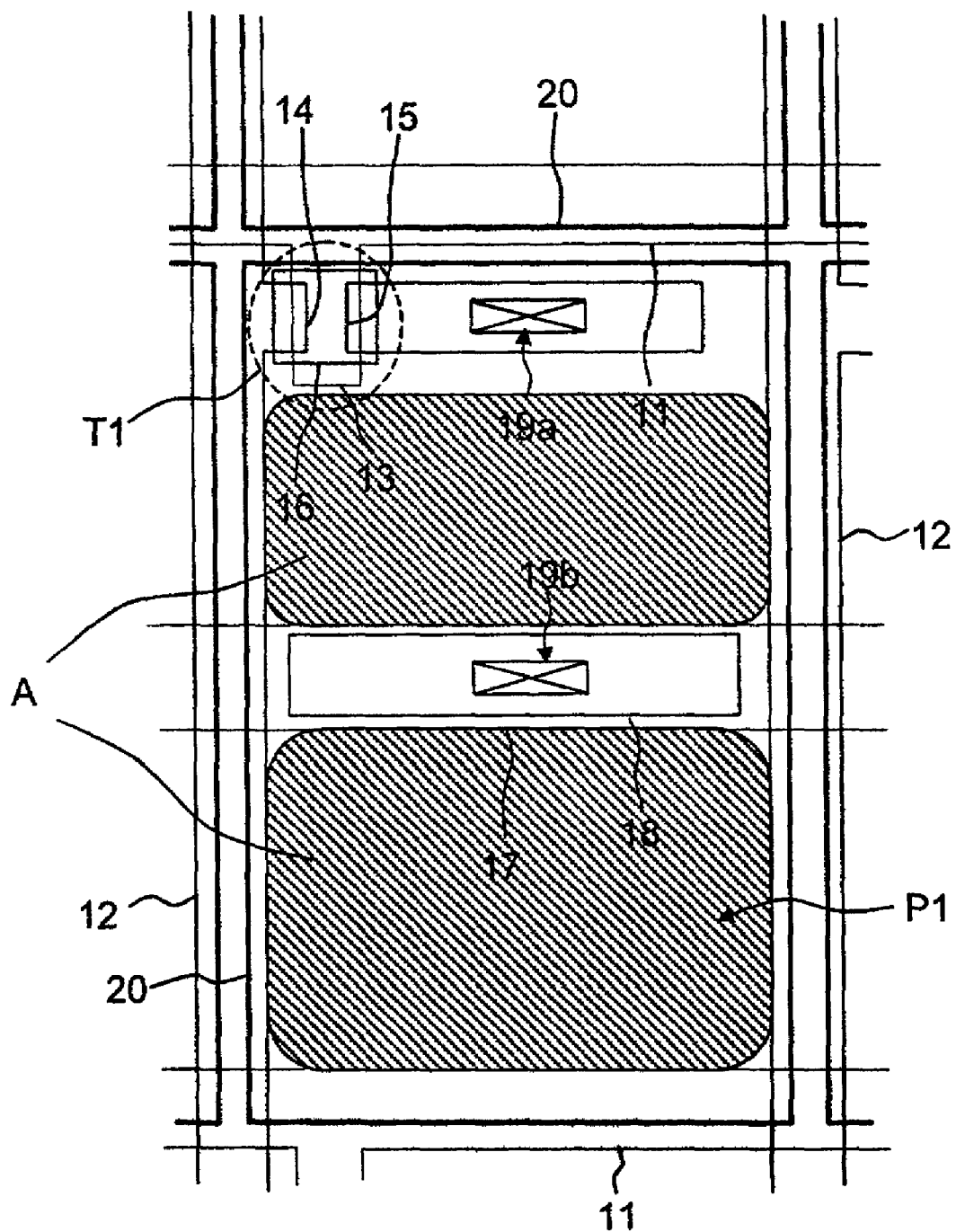
FIG. 2 is a partial plan view of display areas of the array substrate of FIG. 1 according to the related art.
Figure 3:
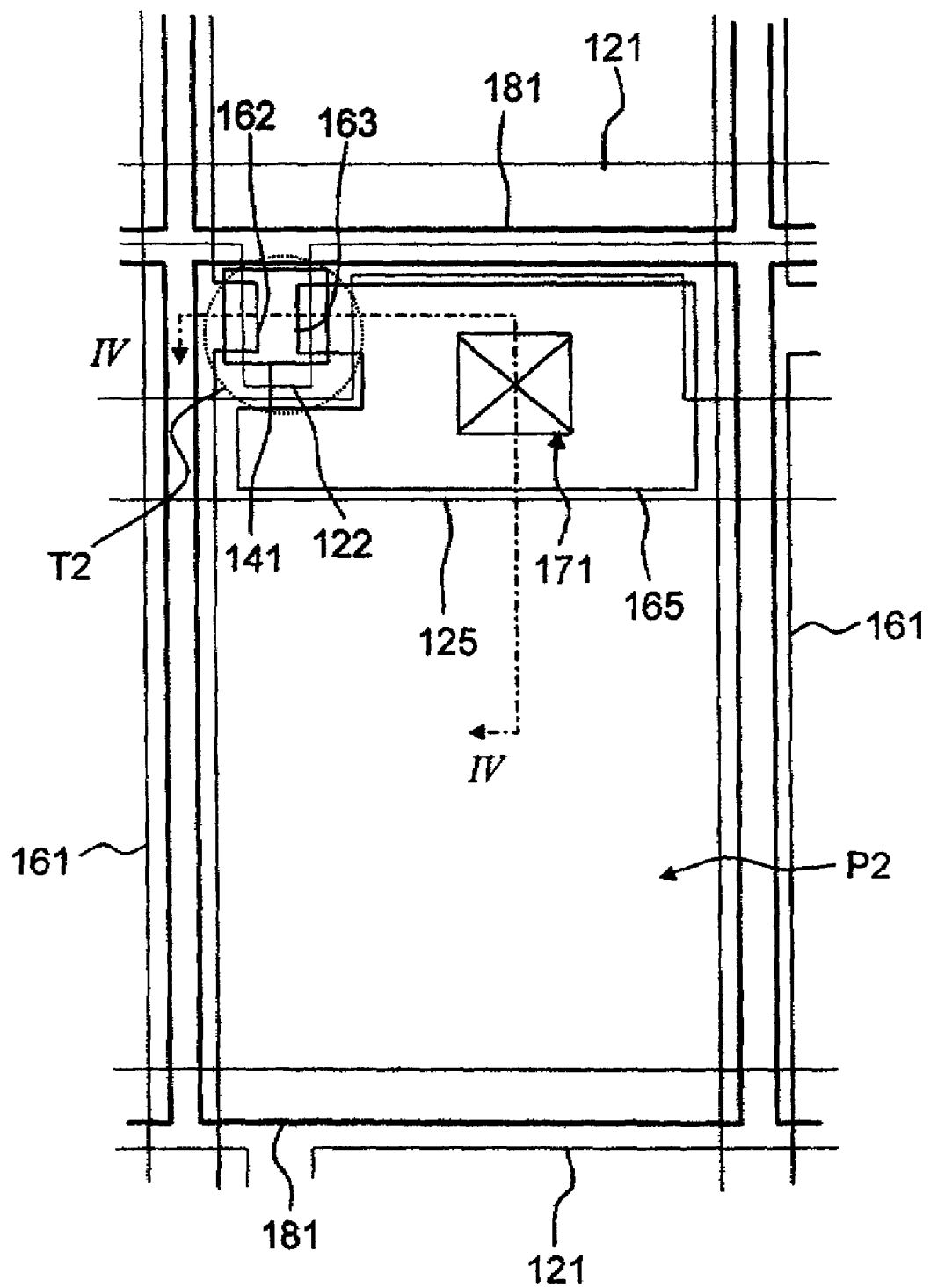
FIG. 3 is a partial plan view of an exemplary array substrate according to the present invention.
Figure 4:
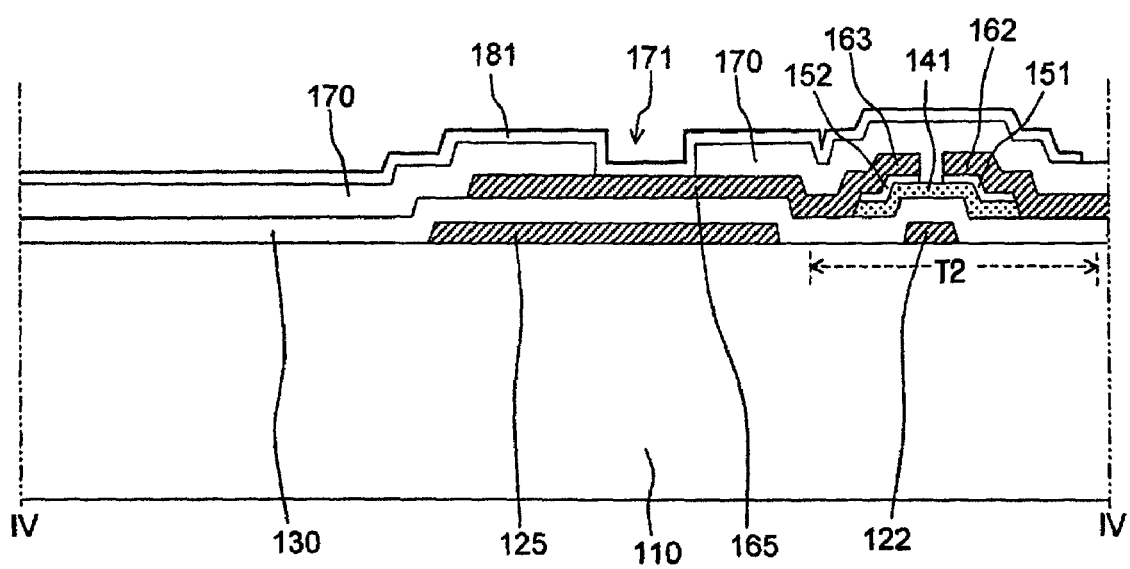
FIG. 4 is a cross-sectional view along line IV-IV of FIG. 3; according to the present invention.

FIG. 3 is a partial plan view of an exemplary array substrate according to the present invention, and FIG. 4 is a cross-sectional view along line IV-IV of FIG. 3; according to the present invention. In FIGS. 3 and 4, gate lines 121 may be disposed upon a transparent substrate 110 along a first direction, and a gate electrode 122 that extends from the gate line 121 may be formed upon the transparent substrate 110. A common line 125 may be disposed on the transparent substrate 110 along the first direction in parallel and adjacent to the gate line 121. The common line 125 may have a protrusion that extends toward the gate line 121. The gate lines 121 and common line 125 may be formed of an opaque metal. A gate insulation layer 130 may be formed upon the transparent substrate 110 to cover the gate lines 121, gate electrode 122 and common line 125. The gate insulation layer 130 may be selected from silicon nitride ($SiN_x$) and silicon oxide ($SiO_2$), or may be a combination of both silicon nitride ($SiN_x$) and silicon oxide ($SiO_2$). An active layer 141 made of amorphous silicon may be formed upon the gate insulation layer 130, especially over the gate electrode 122. A first ohmic contact layer 151 and a second ohmic contact layer 152 both of which may be made of impurity-doped amorphous silicon may be formed upon the active layer 141.

After forming the first and second ohmic contact layers 151 and 152, a metallic material may be formed upon the gate insulation layer 130 to cover the first and second ohmic contact layers 151 and 152. Then, the metallic material may be patterned to form data lines 161, a source electrode 162, a drain electrode 163, and a capacitor electrode 165. The data lines 161 may be arranged along a second direction perpendicular to the first direction of the gate lines 121, thereby defining a pixel region P2. The source electrode 162 may extend from the data line 161 over the gate electrode 122, and may contact the first ohmic contact layer 151. The drain electrode 163 may be spaced apart from the source electrode 162, and may contact the second ohmic contact layer 152, thereby overlapping an opposite end of the gate electrode 122. Thus, a thin film transistor T2 that includes the gate electrode 122, the active layer 141, the first and second ohmic contact layers 151 and 152, and source and drain electrodes 162 and 163 is completed. The capacitor electrode 165 may be formed over the common line 125, and may be connected to the drain electrode 163. The capacitor electrode 165 may overlap not only a portion of the common line 125, but also may overlap the protrusion of the common line 125, thereby constituting a storage capacitor using the gate insulation layer 130 as a dielectric layer.

A passivation layer 170 may be formed upon the gate insulation layer 130 to cover the data line 161, the source and drain electrodes 162 and 163, and the capacitor electrodes 165. The passivation layer 170 may include silicon nitride ($SiN_x$) and/or silicon oxide ($SiO_2$), and may have a contact hole 171 that exposes a portion of the capacitor electrode 165. A transparent conductive material such as indium tin oxide, for example, may be formed upon the passivation layer 170, and then patterned to form a pixel electrode 181. In FIG. 4, the pixel electrode 181 may overlap the TFT T2, and may contact the capacitor electrode 165 through the contact hole 171. Alternatively, the pixel electrode 181 may not overlap the TFT T2.

Figure 5:
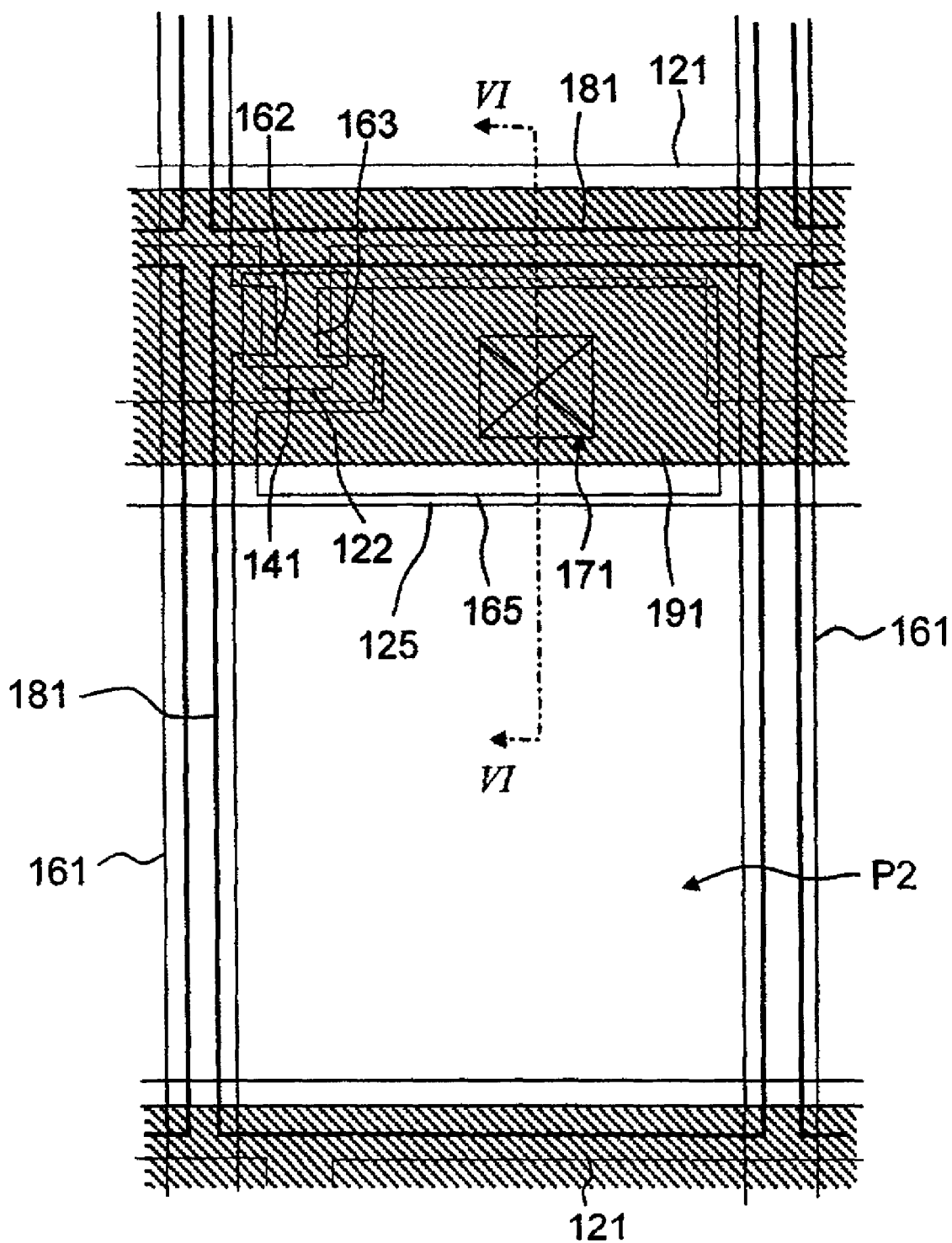
FIG. 5 is a partial plan view showing an exemplary liquid crystal display device according to the present invention.
Figure 6:
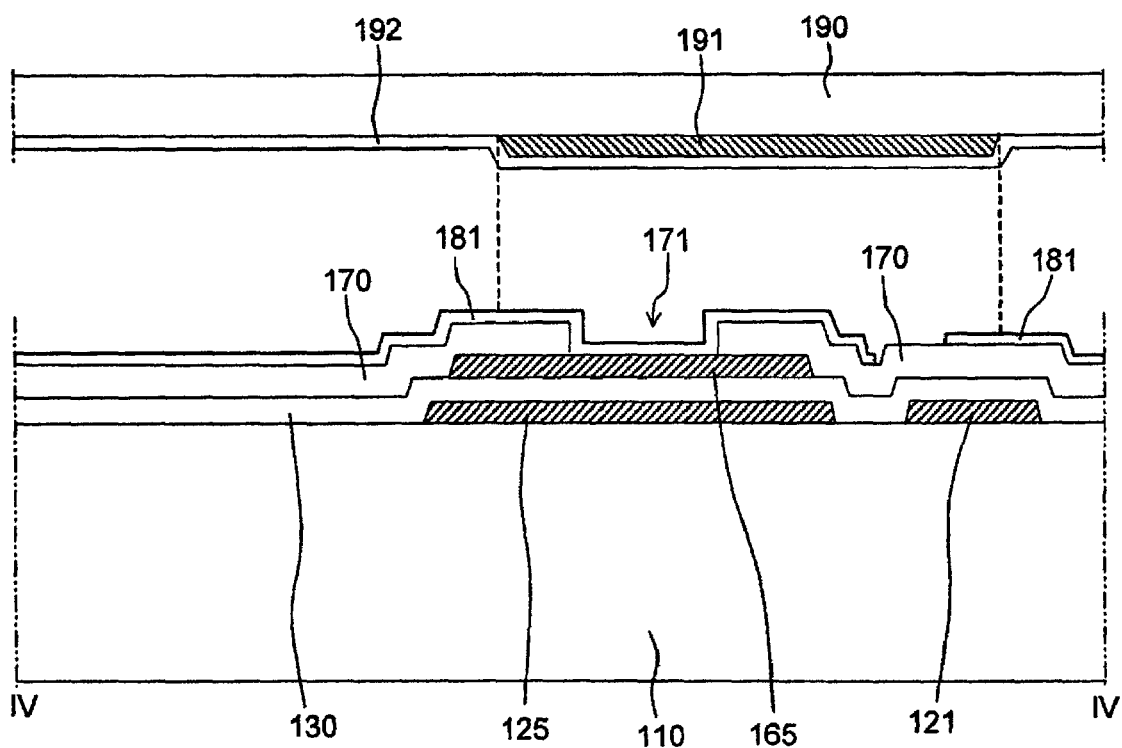
FIG. 6 is a cross-sectional view along line VI-VI of FIG. 5 according to the present invention.

FIG. 5 is a partial plan view showing an exemplary liquid crystal display device according to the present invention, and FIG. 6 is a cross-sectional view along line VI-VI of FIG. 5 according to the present invention. In FIGS. 5 and 6, a lower substrate of the exemplary LCD device shown in FIGS. 5 and 6 may be the same as the lower substrate shown in FIGS. 3 and 4. Accordingly, some detailed explanation for the array substrate may be omitted. Furthermore, although a color filter layer is usually included in the upper substrate, it is not illustrated in FIGS. 5 and 6 in order to simplify the drawings. In FIGS. 5 and 6, the array substrate may include the TFT, the storage capacitor, and the pixel electrode. As previously described, the TFT may include the gate electrodes 122, the active layer 141, the source electrode 162, and the drain electrode 163. The storage capacitor may include the common electrode 125, the capacitor electrode 165, and the gate insulation layer 130 interposed therebetween. The pixel electrode 181 may contact the capacitor electrode 165 through a contact hole 171.

In the upper substrate of the LCD device of FIGS. 5 and 6, a black matrix 191 may be formed upon a rear surface of a substrate 190. A common electrode 192 may also be formed upon the rear surface of the substrate 190, thereby covering the black matrix 191. The black matrix 191 prevents any light leakage that may occur in the LCD device. The black matrix 191 corresponds in position to the gate line 121 and common line 125, thereby covering the capacitor electrode 165 and the TFT. Specifically, the black matrix 191 may be arranged in a position between the gate line 121 and the adjacent common line 125. Accordingly, since the gate lines 121 and the common lines 125 may be made of an opaque metallic material, the black matrix 191 may not necessarily have to be large in size to prevent light leakage even though the black matrix only covers portions of the gate line 121 and common line 125. Thus, a high aperture ratio may be attained.

Figure 7:
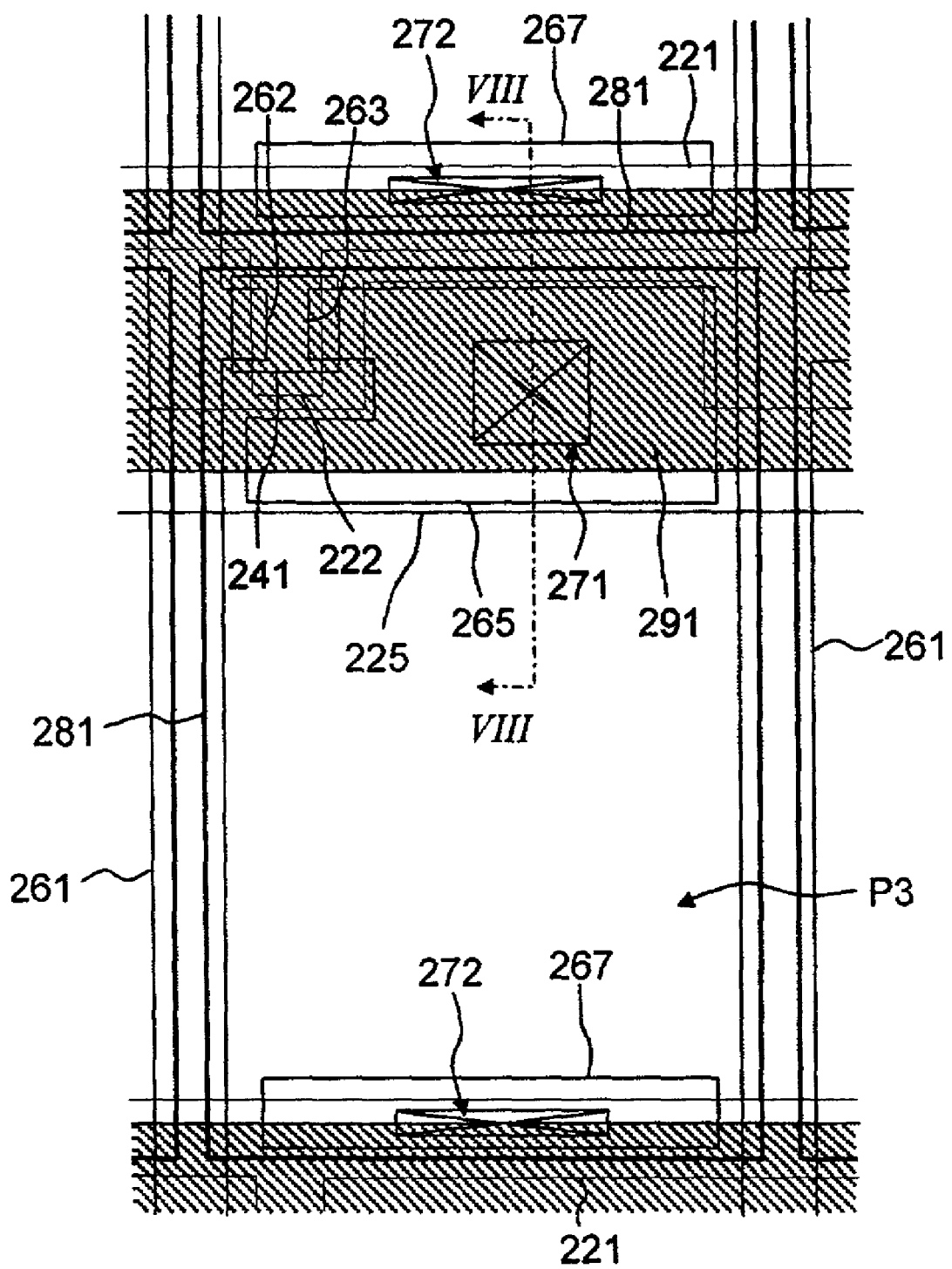
FIG. 7 is a partial plan view of another exemplary liquid crystal display device according to the present invention.
Figure 8:
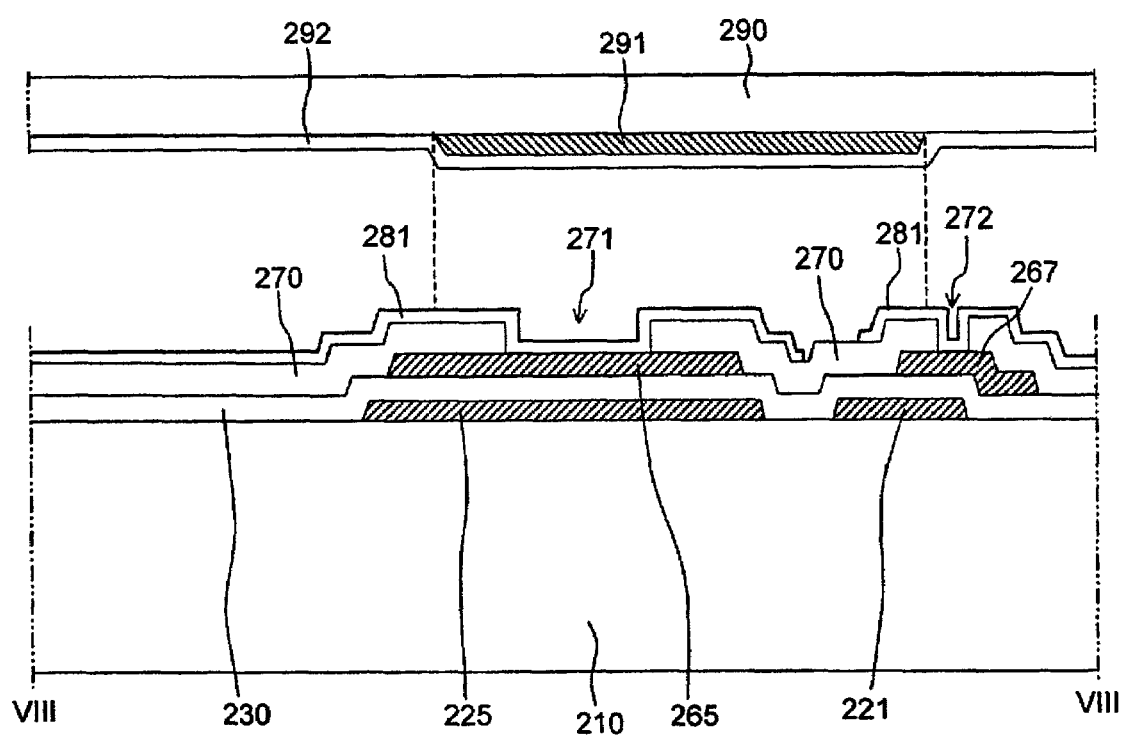
FIG. 8 is a cross-sectional view along line VIII-VIII of FIG. 7 according to the present invention.

FIG. 7 is a partial plan view of another exemplary liquid crystal display device according to the present invention, and FIG. 8 is a cross-sectional view along line VIII-VIII of FIG. 7 according to the present invention. In FIGS. 7 and 8, an additional storage capacitor may be incorporated into the array substrate of the LCD device.

In FIGS. 7 and 8, a first metallic material may be formed upon a first transparent substrate 210, and patterned to form gate lines 221, a gate electrode 222, and a common line 225 on the first transparent substrate 210. The gate lines 221 may be disposed along a first direction upon the first transparent substrate 210, and the common line 225 may be arranged along the first direction in parallel and adjacent to the gate line 221. The gate electrode 222 may extend from the gate line 221, and the common line 225 may include a protrusion that extends from the common line 225 toward the gate line 221. The first metallic material that is used to form the gate lines 221, the gate electrode 222, and the common line 225 may include an opaque metal.

After patterning the first metallic material, a gate insulation layer 230 may be formed upon the transparent substrate 210 to cover the patterned first metallic material. The gate insulation layer 230 may be selected from one of silicon nitride (SiN$_x$) and silicon oxide (SiO$_2$), or may be a combination of both silicon nitride (SiN$_x$) and silicon oxide (SiO$_2$). Then, an active layer 241 that may include amorphous silicon may be formed upon the gate insulation layer 230, especially over the gate electrode 222. A first ohmic contact layer 251 and a second ohmic contact layer 252 may be formed upon the active layer 241, and may include impurity-doped amorphous silicon.

After forming the ohmic contact layers 251 and 252, a second metallic material may be formed upon the gate insulation layer 230 to cover the ohmic contact layers 251 and 252, and patterned to form data lines 261, a source electrode 262, a drain electrode 263, a first capacitor electrode 265, and a second capacitor electrode 267. The data lines 261 may be arranged along a second direction perpendicular to the first direction of the gate lines 221, thereby defining a pixel region P3. The source electrode 262 may extend from the data line 261 over the gate electrode 222, and may contact the first ohmic contact layer 251. The drain electrode 263 may be spaced apart from the source electrode 262, and may contact the second ohmic contact layer 252, thereby overlapping the opposite ends of the gate electrode 222. Thus, a thin film transistor that includes the gate electrode 222, the active layer 241, the first and second ohmic contact layers 251 and 252, and the source and drain electrodes 262 and 263 is completed. The first capacitor electrode 265 may be formed over the common line 225, and may be connected to the drain electrode 263. The first capacitor electrode 265 may overlap both a portion of the common line 225 and the protrusion of the common line 225, thereby constituting a first storage capacitor using the gate insulation layer 230 as a dielectric layer. The second capacitor electrode 267 may be disposed over a portion of the gate line 221, thereby overlapping the portion of the gate line 221. The second capacitor electrode 267 and the portion of the gate line 221 may form a second storage capacitor also using the gate insulation layer 230 as a dielectric layer.

A passivation layer 270 may be formed upon the gate insulation layer 230 to cover the patterned second metallic material. The passivation layer 270 may include one of silicon nitride (SiN$_x$) and silicon oxide (SiO$_2$), or may include a combination of both silicon nitride (SiN$_x$) and silicon oxide (SiO$_2$). The passivation layer 270 may include a first contact hole 271 that exposes a portion of the first capacitor electrode 265, and a second contact hole 272 that exposes a portion of the second capacitor electrode 265. A transparent conductive material such as indium tin oxide, for example, may be formed upon the passivation layer 270, and patterned to form a pixel electrode 281. In FIG. 8, the pixel electrode 281 may contact the first capacitor electrode 265 through the first contact hole 271, and may contact the second capacitor electrode 267 through the second contact hole 272.

In FIGS. 7 and 8, the upper substrate of the LCD device may include a black matrix 291 formed on a rear surface of a second transparent substrate 290, and a common electrode 292 may also be formed upon the rear surface of the second transparent substrate 290, thereby covering the black matrix 291. As previously described, since the black matrix 291 corresponds in position to the gate line 221 and common line 225, the light leakage that may occur in the LCD device is prevented.

According to the present invention, since the common line is adjacent to the gate line, and since the black matrix is arranged in a position between the gate line and the adjacent common line, the black matrix may not necessarily have to be large in size to prevent the light leakage. Furthermore, since the gate line and the common line may include the opaque metal, the light leakage is prevented even though the black matrix only covers portions of the gate line and common line. As a result, the aperture ratio is not decreased. Moreover, since the additional storage capacitor may be formed using the portion of the gate line, the storage capacity of the additional storage capacitor further increases and the leakage of voltage is further prevented.

It will be apparent to those skilled in the art that various modifications and variation can be made in the array substrate for a liquid crystal display substrate having a high aperture ratio and a method for fabricating the same of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a transparent substrate;
   a gate line arranged along a first direction on the transparent substrate;
   a gate electrode extending from the gate line by a predetermined length along a second direction perpendicular to the first direction;
   a common line arranged along the first direction, the common line having a protrusion extending toward the gate line along the second direction spaced apart from the gate line by a predetermined distance;
   a gate insulation layer on the transparent substrate to cover the gate line, the gate electrode, and the common line;
   an active layer on the gate insulation layer and over the gate electrode;
   first and second ohmic contact layers on the active layer;
   a data line arranged along the second direction upon the gate insulation layer;
   a source electrode extending from the data line and contacting the first ohmic contact layer;
   a drain electrode spaced apart from the source electrode and contacting the second ohmic contact layer;
   a first capacitor electrode formed on the gate insulation layer and connected to the drain electrode, the first capacitor electrode overlapping the common line and the protrusion of the common line;
   a passivation layer formed on the gate insulation layer to cover the data line, the source and drain electrodes, and the first capacitor electrode, the passivation layer having a first contact hole exposing a portion of the first capacitor electrode; and
   a pixel electrode formed on the passivation layer and contacting the first capacitor electrode through the first contact hole, wherein the pixel electrode completely overlaps the protrusion of the common line and the first capacitor electrode and partially overlaps the gate line,
   wherein the predetermined length of the gate electrode is greater than the predetermined distance between the protrusion and the gate line, the protrusion extends past a side of the first capacitor electrode closest to the gate line along the second direction, and the first capacitor electrode extends past the protrusion along the first direction, and wherein the gate line is exposed through a space between the adjacent pixel electrodes along the second direction.

2. The array substrate according to claim 1, wherein the common line includes a same material as the gate line.

3. The array substrate according to claim 2, wherein the common line and the gate line include an opaque metallic material.

4. The array substrate according to claim 1, wherein the data line, the source and drain electrodes, and the first capacitor electrode are simultaneously formed of a same material.

5. The array substrate according to claim 1, further comprising a second capacitor electrode formed upon the gate insulation layer and covers a portion of the gate line.

6. The array substrate according to claim 5, wherein the first capacitor electrode and the second capacitor electrode are simultaneously formed of a same material.

7. The array substrate according to claim 5, wherein the passivation layer includes a second contact hole exposing a portion of the second capacitor electrode.

8. The array substrate according to claim 7, wherein the pixel electrode contacts the second capacitor electrode through the second contact hole.

9. The array substrate according to claim 1, wherein the protrusion extends from the common line toward the gate line along the second direction.

10. The array substrate according to claim 9, wherein the protrusion is arranged between the gate line and the common line.

11. The array substrate according to claim 1, wherein the gate line and the data line define a pixel region.

12. The array substrate according to claim 1, wherein the pixel electrode is disposed within the pixel region.

13. A method for fabricating an array substrate for a liquid crystal display device, comprising the steps of:

forming a gate line arranged along a first direction on a transparent substrate;

forming a gate electrode extending from the gate line by a predetermined length along a second direction perpendicular to the first direction;

forming a common line arranged along the first direction, the common line having a protrusion extending toward the gate line along the second direction spaced apart from the gate line by a predetermined distance;

forming a gate insulation layer on the transparent substrate to cover the gate line, the gate electrode, and the common line;

forming an active layer on the gate insulation layer and over the gate electrode;

forming first and second ohmic contact layers on the active layer;

forming a data line arranged along the second direction upon the gate insulation layer;

forming a source electrode extending from the data line and contacting the first ohmic contact layer;

forming a drain electrode spaced apart from the source electrode and contacting the second ohmic contact layer;

forming a first capacitor electrode on the gate insulation layer to connect to the drain electrode, the first capacitor electrode overlapping the common line and the protrusion of the common line;

forming a passivation layer on the gate insulation layer to cover the data line, the source and drain electrodes, and the first capacitor electrode, the passivation layer having a first contact hole exposing a portion of the first capacitor electrode; and forming a pixel electrode on the passivation layer to contact the first capacitor electrode through the first contact hole, wherein the pixel electrode completely overlaps the protrusion of the common line and the first capacitor electrode and partially overlaps the gate line, wherein the predetermined length of the gate electrode is greater than the predetermined distance between the protrusion and the gate line, the protrusion extends past a side of the first capacitor electrode closest to the gate line along the second direction, and the first capacitor electrode extends past the protrusion along the first direction, and wherein the gate line is exposed through a space between the adjacent pixel electrodes along the second direction.

14. The method according to claim 13, wherein the common line includes a same material as the gate line.

15. The method according to claim 14, wherein the common line and the gate line include an opaque metallic material.

16. The method according to claim 13, wherein the steps of forming the data line, the source and drain electrodes, and the first capacitor electrode are simultaneously formed of a same material.

17. The method according to claim 13, further comprising a step of forming a second capacitor electrode on the gate insulation layer to cover a portion of the gate line.

18. The method according to claim 17, wherein the step of forming a first capacitor electrode and the step of forming a second capacitor electrode are simultaneously performed using a same material.

19. The method according to claim 17, wherein the step of forming a passivation layer includes forming a second contact hole to expose a portion of the second capacitor electrode.

20. The method according to claim 19, wherein the pixel electrode contacts the second capacitor electrode through the second contact hole.

21. The method according to claim 13, wherein the protrusion extends from the common line toward the gate line along the second direction.

22. The method according to claim 21, wherein the protrusion is arranged between the gate line and the common line.

23. The method according to claim 13, wherein the gate line and the data line define a pixel region.

24. The method according to claim 23, wherein the pixel electrode is disposed within the pixel region.

* * * * *